Patented Aug. 27, 1935

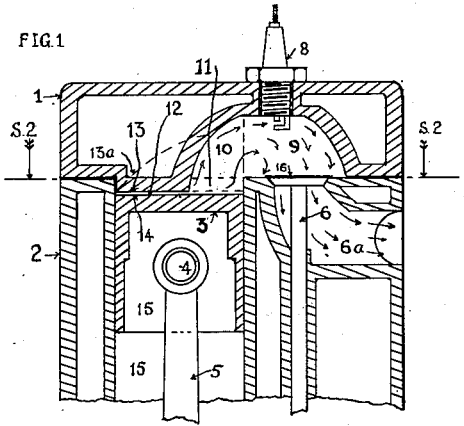

2,012,845

UNITED STATES PATENT OFFICE 2,012,845

INTERNAL COMBUSTION ENGINE

Jean A. H. Barkeij, Altadena, Calif., assignor to George C. Arvedson, New York, N. Y.

Original application February 11, 1928, Serial No. 253,594, now Patent No. 1,741,355, dated December 31, 1929. Divided and this application December 27, 1929, Serial No. 416,865

11 Claims. (Cl. 123—191)

My invention relates to engines and more particularly to the construction and arrangement of the combustion chamber, with special reference to a construction commonly referred to as an engine of the L-head type. This application is a division of my application, Serial Number 253,594, filed February 11, 1928, now issued into Patent #1,741,355 for Internal combustion engine.

It is well known that engines of the character described and which are provided with a combustion chamber tending to produce turbulence of the fuel mixture on compression of same in the combustion chamber, are more or less rough or harsh in operation, and are more or less subject to detonation and other objectionable characteristics, due in part to the fact that the pressure of the explosion is initially exerted on one side of the piston.

Some engines heretofore proposed provide a combustion chamber consisting of a chamber portion contained within the cylinder head and another chamber portion contained within the cylinder, these chamber portions being connected by a restricted throat portion especially designed to retard or hold back the flame travel in order to lessen the tendency of the engine to detonate, but such constructions interfere to some extent with the production of turbulence of the fuel mixture in the combustion chamber during compression on account of the restricted throat portion located between the cylinder bore and the combustion chamber in the cylinder head.

It is an object of my present invention to provide an engine structure having generally improved characteristics by providing a construction adapted to produce a maximum of turbulence of the fuel mixture in the combustion chamber during engine compression by providing a throat portion connecting the two portions of the combustion chamber that is so constructed as to not interfere with the production of such turbulence.

Another object of my present invention is to provide an engine construction in which the danger of detonation is relatively decreased by providing means whereby to protect the top of the piston against the heat of the explosion and to thereby decrease its working temperature.

A further object of my present invention relates in general to the construction of a combustion chamber and its relation with respect to the cylinder bore and the intake valve means and exhaust valve means, and in particular with respect to the rotation of the spark ignition device or devices whereby to promote efficient and uniform combustion of the combustible charge contained within the combustion chamber and to thus transmit the pressure produced on burning the combustible charge to the engine piston with a minimum of interference resulting from the incorporation of restricted passages as employed heretofore in other engines of this general type.

A stilll further object of my present invention relates in part to the particular construction of the combustion chamber and its general contour and shape whereby to provide a combustion chamber which facilitates a more efficient engine operation and which further promotes relatively greater fuel economy in the operation of said engine.

For a further understanding of my present invention, reference may be had to the accompanying drawing in which like characters refer to like parts throughout the several views, and in which:

Fig. 1 is a vertical sectional view of an engine showing a typical cylinder and associated cylinder head as employed with an engine of the L-head type and which is constructed in accordance with my invention, said section being taken substantially on the line S1—S1 of Fig. 2, Fig. 2 is a horizontal sectional view through Fig. 1, taken substantially on the line S2—S2 of Fig. 1, Fig. 3 is a vertical sectional view of an engine constructed substantially in accordance with my invention and showing a modified form of construction, said sectional view being taken substantially on the line S3—S3 of Fig. 4, Fig. 4 is a horizontal sectional view showing the construction illustrated in Fig. 3 and taken substantially on the line S4—S4 of Fig. 3, Fig. 5 is a sectional view taken on the line S5—S5 of Fig. 5a and showing in general the plan of a modified form of combustion chamber, and Fig. 5a is a vertical sectional view of an engine showing a modified form of construction.

In the accompanying drawing I have chosen for purposes of illustration to show my invention in connection with an engine having a cylinder head provided with a combustion chamber which extends laterally outwardly of the cylinder bore, said type as herein illustrated being generally referred to as an engine of the L-head type.

In the constructions illustrated I preferably indicate the engine block by the reference character 2 having a cylinder 15 and an associated cylinder head structure I adapted for closing the outer end of said cylinder. A piston 3 is operable within the cylinder and is preferably connected with the engine crankshaft—not shown—by means of a connecting rod 5 which is connected in the usual way with the wrist pin 4 carried by the piston 3. The cylinder head structure is preferably recessed as shown in the drawing to provide a combustion chamber, said head and piston when in its outermost position of travel cooperating to define said combustion chamber. This combustion chamber is preferably designated as consisting of a portion 9 overlying the engine block and lying without the limits of the cylinder bore, said chamber further consisting of the portion 10 overlying the cylinder bore. Preferably the cylinder head is provided with a depending portion extending inwardly of the cylinder bore and terminating in a face 13 extending substantially at right angles to the axis of the said cylinder bore. This face 13 cooperates with the outer face 14 of the piston and clearance is preferably provided between these faces 13 and 14 when the piston reaches its outermost position of travel whereby to provide a combustion chamber portion 12 lying within the cylinder bore immediately above the piston and communicating with the remaining portions 9 and 10 of the combustion chamber by means of a throat portion 11 preferably contained within the cylinder bore. I have preferably provided intake and exhaust valves respectively numbered 7 and 6, these valves preferably having valve portions 17 and 16 respectively for closing the intake and exhaust port openings associated with said combustion chamber. In Fig. 1 I have shown an exhaust gas passage 6a communicating with the exhaust port and it will be obvious that suitable intake passages may be constructed as well.

The combustion chambers as illustrated in Figs. 1 to 4 inclusive have longitudinal and transverse axes which are of greater length than the height of the chamber. In the construction particularly shown in Fig. 1, it will be noted that the axes have lengths which are substantially the same and in the construction shown in Figs. 3 and 4, it will be noted that the axis extending longitudinally of the engine is relatively greater than the axis extending transverse of the engine, while in the construction shown in Figs. 5 and 5a, the axis of the combustion chamber extending longitudinally of the engine is relatively less than the axis of the combustion chamber extending through the valves and transverse of the engine.

It can be readily seen from a comparison of these figures that a compression chamber which is provided with one or more valves overlapping the cylinder bore, as shown in Figs. 3, 4, 5 and 5a, may be constructed with a relatively smaller volume than a combustion chamber in which the valves are both located beside the cylinder, as in Figs. 1 and 2. It will be quite evident that the volumes of the combustion chamber portions as shown in the accompanying drawing may be varied as desired to promote a more efficient engine operation resulting from a more efficient combustion of the gases introduced into the combustion chamber.

I find in many instances that improved engine performance can be had by providing a combustion chamber in which more efficient combustion can be attained by reason of a particular combustion chamber construction in which that portion of the combustion chamber overlying the block is substantially equal in volume to that portion of the combustion chamber overlying the cylinder bore, the latter combustion chamber portion including an unrestricted throat. Preferably, this throat is contained within the cylinder bore and is indicated by the reference character 11 in Figs. 1 and 2. In Fig. 1 the combustion chamber portion 9 is substantially equal in volume to the combustion chamber portion comprising portions 10, 11 and 12.

Thus by varying the size and contour of the combustion chamber portions, the ratio between the volume of the combustion chamber portion overlying the cylinder block with respect to the volume of the combustion chamber portion overlying the cylinder bore can be varied. These two main combustion chamber portions can be thus proportioned in volume in many ways, by varying the axial length of the re-entrant cylinder head portion, or by varying the contour and shape of said combustion chamber portions 9 and 10.

Although I find it desirable in most instances to provide a combustion chamber portion overlying the cylinder block substantially equal in volume to the combustion chamber portion overlying the cylinder bore, it is obvious that in some instances it will be desirable to construct the aforesaid combustion chamber portions unequal in volume, and this can be done without a major change in the engine design, simply by varying the clearance 12 or by varying the axial length of the portion 11, the cross-section area of said throat portion remaining unchanged.

It is also true that the proportioning of said combustion chamber portions is dependent to some extent on the valve arrangement, and thus by making a suitable choice of valve arrangements, engine bore and stroke, the aforesaid combustion chamber portions may be readily proportioned so as to be substantially equal in volume.

It will be evident that engines having a cylinder head provided with a portion depending within the cylinder bore may be provided for obtaining the desired result, and engines having a cylinder head in which the under-face of the cylinder head is flush with the cylinder bore outer end can be as readily constructed to obtain the desired results.

The combustion chamber as shown in Figs. 1 and 2 needs to be constructed in such a way that the chamber walls lie as close to the valves as is possible without interferring with the valve actuation, and these valves should be placed as close as possible to the cylinder bore, the main height of the combustion chamber being constructed as low as possible without choking the flow of fuel mixture as the same fills said combustion chamber. It will be noted that if due care is taken with the design and construction of the combustion chamber in the cylinder head, that it is possible to maintain the volume of this portion of the combustion chamber at a minimum thereby permitting the construction of the remaining combustion chamber portion within the cylinder bore of a dimension as substantially shown in Figs. 3, 4 and 5.

In the engine construction shown in Fig. 1, it will be noted that the throat portion 11 extends substantially axially of the cylinder bore and is bounded by wall portions formed by the cylinder wall and the substantially axially extending portion of the cylinder head projecting inwardly of the cylinder bore. The cross-sectional area of this throat portion is less than the cross-sectional area of the cylinder bore and is preferably constructed to have a cross-sectional area in excess of the cross-sectional area of the intake port associated with the combustion chamber. If desired, the throat 11 may be varied and the same may be constructed to overlap the greater amount of the cylinder bore as shown in Fig. 1 by the dotted line 13a, which indicates the contour of a combustion chamber throat of this type.

The spark plug 8 as shown in Fig. 5a is located remote from the cylinder bore but if desired an additional or second spark plug 8a may be carried by the cylinder head and located within the restricted or throat portion connecting the main portion of the combustion chamber with the portion of the combustion chamber lying within the cylinder bore. If only one spark plug, such as the one indicated by the reference character 8 were used, the unburned part of the gases in the left part of the combustion chamber would be compressed towards the hot surface of the top of the piston after the initial expansion of the gases. Conversely, if only the spark plug designated 8a were used, the unburned part of the gases would be compressed towards the hot exhaust valve and may be ignited and detonated by the radiation of heat from said exhaust valve. If both spark plugs were used simultaneously, they will prevent each other from pressing the unburned parts of the charge towards either hot spot in the combustion chamber and thus by employing two such spark plugs the combustion of the fuel mixture within the combustion chamber is relatively improved. A further modification of this principle may be had by placing a single spark plug nearer the exhaust valve than to the inlet valve, thus permitting the incoming fuel mixture to cool the exhaust valve as well as to start the flame travel from a region in the vicinity of the exhaust valve so that when the pressure of the unburned gases reaches a maximum where detonation may occur, the unburned gases are not in the vicinity of the exhaust valve and thus the danger of pre-ignition is materially lessened.

It will be noted that the construction shown in Figs. 1 and 2 provide a combustion chamber in the cylinder head which is substantially heart-shaped in plan and the side walls of the combustion chamber which converge towards the center of the cylinder bore are constructed concave with respect to each other and they preferably intersect in a point adjacent the center axis of the cylinder bore. It will be noted that these side walls of the combustion chamber, see Fig. 2, preferably intersect at an angle in the vicinity of the cylinder bore axis which is also in the vicinity of the hottest part of the piston. The purpose of this construction in which the side walls meet at an angle provides a construction in which any wet fuel accumulations adhering to the wall of the combustion chamber are caused to drop off at that point of the combustion chamber which overlies the hottest part of the piston. Since the center of the piston face is usually the hottest part, the point at which the wet fuel is caused to drop off is preferably located in the vicinity of the cylinder bore axis. Where such side walls merge into a rounded corner the wet fuel does not tend to drop off, but may be carried around the corner and drop off at a point which is not near the hottest part of the piston and is therefore not readily re-vaporized as is the case with the construction shown in Figs. 1 and 2. It will be further noted that the side walls of the combustion chamber extending outwardly from the engine block are curved inwardly toward each other, thereby providing a substantially dome-shaped combustion chamber materially lessening excessive friction in the fuel mixture flow during the compressing operation of the engine. Furthermore such a combustion chamber construction provides a chamber of minimum volume without restricting fuel mixture flow.

It may be noted that the construction shown in Fig. 1 provides a spark plug or other spark ignition device which is located intermediate the cylinder bore and the plane containing the valve axes, and preferably this spark ignition device is located substantially midway of the plane containing said valve axes and the adjacent wall of the cylinder bore.

In the constructions shown in the illustrated embodiment of my invention I have provided an engine structure incorporating a combustion chamber of improved design and construction whereby to materially facilitate engine operation and to provide for relatively improved engine performance by promoting a more efficient combustion of the fuel mixture in the combustion chamber and by providing for a uniform burning due to the turbulence produced in the fuel mixture contained within the combustion chamber during engine compression, and furthermore the construction which ignites the fuel mixture in the chamber in the cylinder head sometimes referred to as the major chamber causes a turbulence in the fuel mixture in the throat portion for promoting combustion during the final stages of the combustion period.

It will be further noted that when a clearance between a cylinder head and piston is more than a mechanical minimum as shown in Fig. 3, that the pressure of the gases in the combustion chamber during the combustion period may be distributed over the entire upper face of the piston and thus eliminate piston slap due to localized applications of this pressure with constructions heretofore proposed in which a very minimum of clearance is provided between the cylinder head and piston.

Obviously the cross-sectional area of the throat portion may be varied as desired, but at all times it is preferred that this cross-sectional area of the throat portion be greater than the cross-sectional area of the inlet valve port opening, and furthermore, it should be such as to not restrict the flow of fuel mixture from the cylinder bore into the combustion chamber in the cylinder head during the compression stroke of the engine. The squeezing of the fuel mixture from between the cylinder head and piston is had in all the constructions illustrated for promoting turbulence in the combustion chamber and this turbulence is properly obtained without choking the fuel mixture flow or otherwise interfering with the uniform compression of the entire charge.

Applicant's construction and arrangement of the combustion chamber relative to the valve means and the spark igniting device or devices associated therewith is such as to provide for improved engine performance. It will be apparent that various changes and modifications may be made without departing from the spirit of the invention as defined by the appended claims.

What I claim as my invention is:

1. In an engine of the L-head type, a cylinder, a cylinder head for closing the outer open end of the cylinder and having a combustion chamber constructed to overlie a part of the cylinder bore and a portion of the engine block to one side of the cylinder bore, inlet and exhaust valves opening inwardly of the combustion chamber to one side of the cylinder bore, a spark plug in said combustion chamber and located substantially closer to the exhaust valve than to the inlet valve, said combustion chamber including a restricted portion overlying the cylinder bore for placing said chamber in communication with the cylinder bore, and a second spark plug located in said restricted portion above the cylinder bore.

2. In an engine of the L-head type, a cylinder, a piston operable in said cylinder, a cylinder head for closing the outer open end of the cylinder and having a combustion chamber communicating with the cylinder bore, said combustion chamber extending to one side of the cylinder bore and constructed substantially heart shaped in plan.

3. In an engine of the L-head type, a cylinder, a piston operable in said cylinder, a cylinder head for closing the outer open end of the cylinder and having a combustion chamber communicating with the cylinder bore, said combustion chamber extending to one side of the cylinder bore and constructed substantially heart shaped in plan, the two sides of said heart shaped combustion chamber that point towards the cylinder being substantially concave.

4. In an engine of the L-head type, a cylinder, a piston operable in said cylinder, a cylinder head for closing the outer open end of the cylinder and having a combustion chamber communicating with the cylinder bore, said combustion chamber extending to one side of the cylinder bore and constructed substantially heart shaped in plan, the two sides of said heart shaped combustion chamber intersecting at an angle.

5. In an engine of the L-head type, a cylinder, a piston operable in said cylinder, a cylinder head for closing the outer open end of the cylinder and having a combustion chamber communicating with the cylinder bore, said combustion chamber extending from one side of the cylinder bore and constructed substantially heart shaped in plan, the two sides of said heart shaped combustion chamber that point towards the cylinder being substantially concave, said two sides intersecting at an angle.

6. In an engine of the L-head type, a cylinder, a piston operable in said cylinder, a cylinder head for closing the outer open end of the cylinder and having a combustion chamber communicating with the cylinder bore, said combustion chamber extending to one side of the cylinder bore and constructed substantially heart shaped in plan, said two sides forming walls extending outwardly of the cylinder and curved towards each other.

7. In an engine of the L-head type, a cylinder, a piston operable in said cylinder, a cylinder head for closing the outer open end of the cylinder and having a combustion chamber communicating with the cylinder bore, said combustion chamber extending to one side of the cylinder bore and constructed substantially heart shaped in plan, intake and exhaust valve means opening inwardly of the combustion chamber and offset laterally outwardly of the cylinder bore, and spark ignition means located substantially midway of the cylinder bore axis and the plane containing the axes of said valve means.

8. In an engine of the L-head type, a cylinder, a piston operable in said cylinder, a cylinder head for closing the outer open end of the cylinder and having a combustion chamber communicating with the cylinder bore, said combustion chamber extending to one side of the cylinder bore and constructed substantially heart shaped in plan, the two sides of said heart shaped combustion chamber intersecting at an angle substantially adjacent the axis of said cylinder bore.

9. In an engine of the L-head type, a cylinder, a piston operable in said cylinder, a cylinder head for closing the outer open end of the cylinder and having a combustion chamber communicating with the cylinder bore, said combustion chamber extending to one side of the cylinder bore and constructed substantially heart shaped in plan, the two sides of said heart shaped combustion chamber intersecting at an angle substantially adjacent the central portion of the piston.

10. In an engine, a cylinder, a piston operable in said cylinder, a cylinder head closing the outer open end of the cylinder and cooperating with the piston when in its outermost position of travel to define a combustion chamber, said combustion chamber consisting of a portion overlying the cylinder block and a second portion overlying the cylinder bore, said second portion including a portion contained within the cylinder bore and a restricted portion providing restricted communication between said chamber portion overlying the cylinder block and the portion within the cylinder bore, and a plurality of ignition devices, one of said devices being located adjacent the center of the piston face and the other of said devices being located in the combustion chamber portion overlying the cylinder block.

11. In an engine, a cylinder, a piston operable in said cylinder, a cylinder head closing the outer open end of the cylinder and cooperating with the piston when in its outermost position of travel to define a combustion chamber, said combustion chamber consisting of a portion overlying the cylinder block and a second portion overlying the cylinder bore, said second portion including a portion contained within the cylinder bore and a restricted portion providing restricted communication between said chamber portion overlyin the cylinder block and the portion within the cylinder bore, and a plurality of ignition devices, an exhaust valve opening into the combustion chamber portion overlying said cylinder block, one of said devices being located adjacent the center of the piston face and the other of said devices being located adjacent to said exhaust valve.

J. A. H. BARKEIJ.